Dec. 18, 1928.

C. H. CHRISTIAN ET AL 1,695,272

BIN GATE ARRANGEMENT

Filed Dec. 2, 1926

Inventors
Charles H. Christian and Carl F. Walker
By Brockett & Hyde
Attorneys

Patented Dec. 18, 1928.

1,695,272

UNITED STATES PATENT OFFICE.

CHARLES H. CHRISTIAN AND CARL F. WALKER, OF CLEVELAND, OHIO.

BIN-GATE ARRANGEMENT.

Application filed December 2, 1926. Serial No. 152,216.

This invention relates to means for imparting a predetermined characteristic to the feed from a bin to a conveyor arranged to travel beneath the mouth thereof, and receive progressively portions of the contents thereof and convey the same therefrom; and the invention has especial reference to a combination of elements such as those described wherein the mouth of the bin is of relatively great dimension longitudinally of the conveyor travelling beneath it and where the desired feed characteristic is uniformity of flow through the mouth.

In such an arrangement the conveyor is preferably provided laterally with upstanding portions laterally limiting and retaining the load which may be placed upon it, and the sides of the bin mouth extend downwards to the elevation of the upstanding portions of the conveyor. The height of the load which may be moved by the conveyor from the bin is limited by the relative elevation of the rearward end of the bin mouth with respect to the direction of the travel of the conveyor. It is occasionally found necessary that the mouth of a bin so arranged be of relatively great length. A disadvantage resulting from such an arrangement however, is that when a conveyor is arranged and operated as described relative thereto, it is found that the bin is emptied principally from its forward end, that is the transfer from the bin to the conveyor is made largely from that portion of the bin contents positioned in the bin nearest the direction from which the operative part of the conveyor approaches the bin mouth; the opposite or following end of the bin mouth consequently remaining substantially inactive as to flow therethrough, although serving to limit the quantity withdrawn from the bin at any rate of conveyor speed. Such localized dead condition in a bin is extremely objectionable when handling certain classes of goods.

It is the object of our invention to provide means in such a co-operating arrangement of bin and conveyor whereby any desired characteristic of flow through a horizontal section of the bin may be effected, and therefore whereby a substantially continuous and even downward progress of the bin contents may be produced at any horizontal section therethrough; and further to employ only a very simple construction in effecting the result desired.

Figure 1:
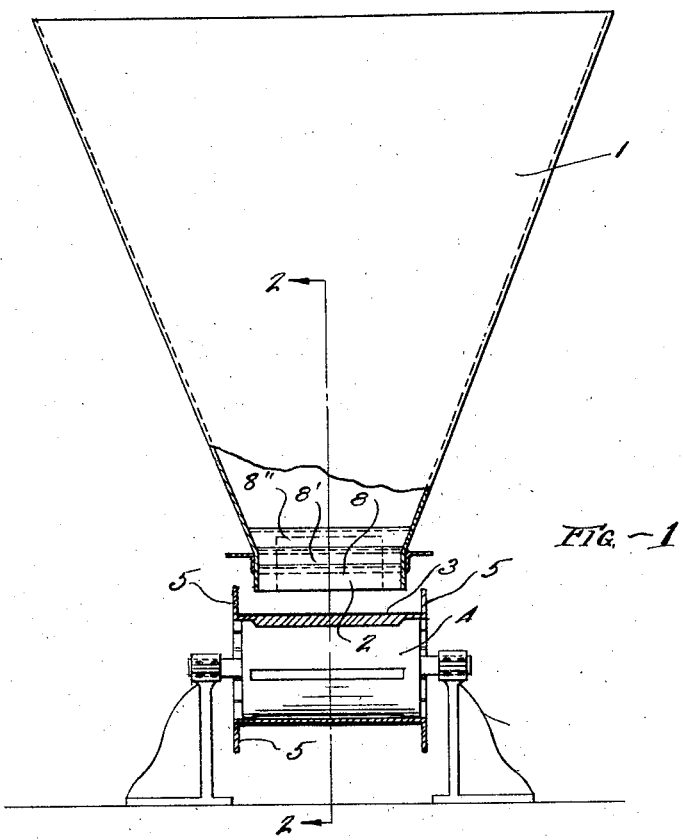
Figure 2:
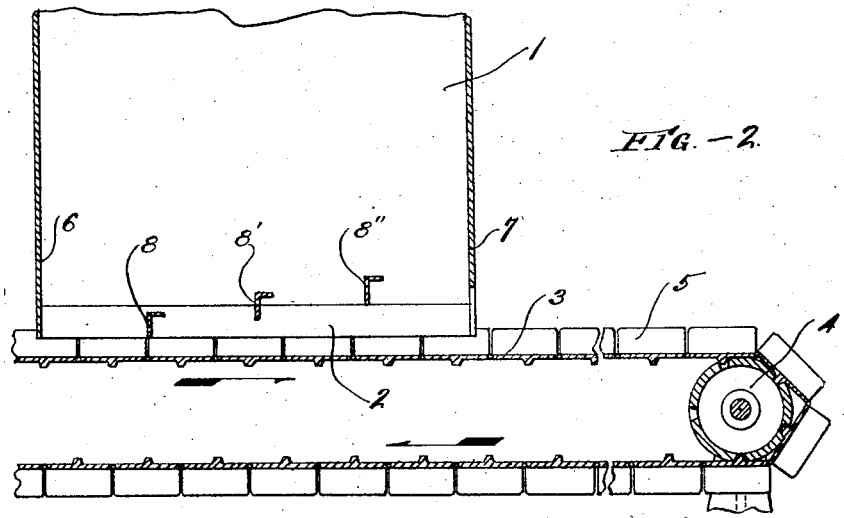

The exact nature of our invention together with further advantages arising therefrom will be apparent from the following description taken in connection with the accompanying drawings in which Fig. 1 is an end elevation of a bin arranged to feed a continuously travelling conveyor as described, the lower portion of the bin being broken away to show details of the bin mouth; Fig. 2 being a typical longitudinal vertical section, as taken along the line 2—2 of Fig. 1.

Referring particularly to the drawings, 1 is a bin the open mouth 2 of which extends from the converging sides of the bin to a position of suitable clearance above the load receiving portion 3 of a conveyor of the well known endless type arranged to travel in the direction of the arrows over suitable driving pulleys 4. Upstanding members 5 may be arranged laterally of the conveyor to extend above the lower extremity of the bin mouth as indicated whereby a load received by the conveyor from the bin will be retained in the conveyor.

It will be obvious that solid fungibles in the bin will upon suitable movement of the conveyor be generally progressively transferred to a dumping position at the bight of the conveyor, the bin contents progressing gradually downwards until the bin is empty.

As described above, however, it has been found that with such an arrangement the tendency is to empty the bin from the forward end 6 of the mouth thereof, that portion of the bin contents adjacent the opposite end 7 remaining subsantially "dead" at least until the forward portion of the bin is empty; the rear end 7 of the bin mouth however serving to limit by a scraping action, the height and therefore the amount of the conveyor load.

According to our invention we position across the mouth of the bin a series of laterally extending members 8, 8', and 8" presenting the vertical surfaces indicated. With this arrangement the amount of load which may be transferred from the forward end 6 of the bin is limited to a pile no higher than the height of the lower extremity of member 8.

The member 8' is spaced as indicated and positioned somewhat above the position of member 8 and the member 8" similarly somewhat above the member 8'; the lower extremity of the end 7 likewise is somewhat above the lower extremity of the member 8". The result of this arrangement is that any section on the conveyor passing from the end 6 to the member 8 will receive but a light load as described from the leading portion of the bin; will in passing between member 8 and 8' receive an added load up to the lower extremities of member 8' and similarly in passing to the position of 8'' and out from under the bin mouth will receive additional increments of load the ultimate maximum being limited by the elevation of the end 7 of the bin.

It will be obvious that the members 8, 8' etc., may be proportioned and positioned longitudinally and vertically so as to impart any desired characteristic to the general progress of the bin contents out of the mouth of the bin and away by the conveyor. For instance, in the arrangement illustrated, were the end 7 of the bin brought down to the elevation of the end 6 thereof and the member 8 made preferably of greater vertical dimension, the conveyor would receive its load almost exclusively from the forward end 6 of the bin; and the members 8' and 8'' would be ineffective.

Our invention contemplates also extending the members 8, 8' etc., upwards to the top of the bin to form separate compartments therein, or in reality a series of longitudinally arranged individual bins. In such case goods of varying nature or quality may be loaded into the various bin compartments and, subject to the positioning of the lower extremities of the members 8, 8' etc., the conveyor loaded with layers of predetermined relative amount.

What we claim is:

1. In a combined bin and conveyor for use in handling granular material, a travelling conveyor substantially imperforate for carrying and conveying the material delivered upon it, a bin above one stretch of said conveyor and having a mouth for delivering materials to said conveyor, said bin forming with said conveyor a side delivery opening for the material where said conveyor passes from said mouth, and vertically fixed narrow baffle strips in the mouth of the bin for insuring delivery of the material from all parts of the bin to prevent caking or clogging.

2. In a combined bin and conveyor for use in handling granular material as in claim 1 wherein the baffle strips are spaced even distances from each other and from the ends of the bin and progressively spaced increasing distances from the forward to the rear end whereby the material is laid in superposed layers from various parts of the bin upon the conveyor.

In testimony whereof we hereby affix our signatures.

CHARLES H. CHRISTIAN.
CARL F. WALKER.